(12) United States Patent
Owen

(10) Patent No.: US 12,151,774 B2
(45) Date of Patent: Nov. 26, 2024

(54) DETACHABLE SEAT ASSEMBLY

(71) Applicant: Anita Wu, Dongguan (CN)

(72) Inventor: Neil Owen, Dongguan (CN)

(73) Assignee: Anita Wu, Dongguan (CN)

( * ) Notice: Subject to any disclaimer, the term of this patent is extended or adjusted under 35 U.S.C. 154(b) by 572 days.

(21) Appl. No.: 17/567,362

(22) Filed: Jan. 3, 2022

(65) Prior Publication Data

US 2023/0211244 A1 Jul. 6, 2023

(51) Int. Cl.
*B62K 9/00* (2006.01)
*B62J 1/00* (2006.01)

(52) U.S. Cl.
CPC .. *B62K 9/00* (2013.01); *B62J 1/00* (2013.01)

(58) Field of Classification Search
CPC .................................. B62K 9/00; B62K 3/14
See application file for complete search history.

(56) References Cited

U.S. PATENT DOCUMENTS 6,601,862 B2 * 8/2003 Kettler .................. B62K 13/02
280/282

FOREIGN PATENT DOCUMENTS

CN            215245239 U   * 12/2021

* cited by examiner

*Primary Examiner* — Kevin Hurley
(74) *Attorney, Agent, or Firm* — MUNCY, GEISSLER, OLDS & LOWE, P.C.

(57) ABSTRACT

A detachable seat assembly, including: a handle member, a seat member and a saddle member, the handle member including a mounting portion at a bottom side thereof, the mounting portion including an inner threaded hole at a front side thereof and a buckling member; the seat member and the handle member being detachably connected, the seat member including a mounting hole within which the mounting portion is inserted, the seat member further including a knob and a first hole, the knob including a handle and a threaded section, the threaded section being screwed to the inner threaded hole, the buckling member being disposed through the first hole; the saddle member being mounted on the handle member and the seat member.

10 Claims, 7 Drawing Sheets

DETACHABLE SEAT ASSEMBLY

BACKGROUND OF THE INVENTION

Field of the Invention

The present invention relates to a detachable seat assembly.

Description of the Prior Art

A seat generally includes a handle portion and a seat body, and is often applied to a children's exercise bike, toy car or the like. However, most of the children's exercise bike, toy car and the like each have a seat which is integrally formed of one piece and cannot be removed or disassembled, which brings great inconvenience to users. Because the seat is integrally formed of one piece, the children's exercise bike, toy car or the like is large in size and inconvenient to carry, and it considerably narrows the range of use.

The present invention is, therefore, arisen to obviate or at least mitigate the above-mentioned disadvantages.

SUMMARY OF THE INVENTION

The main object of the present invention is to provide a detachable seat assembly which is detachable and quick to assemble/disassemble, convenient to carry and store, and capable of wide range of use.

To achieve the above and other objects, a detachable seat assembly is provided, including: a handle member, a seat member and a saddle member, the handle member including a mounting portion at a bottom side thereof, the mounting portion including an inner threaded hole at a front side thereof and a buckling member; the seat member and the handle member being detachably connected, the seat member including a mounting hole within which the mounting portion is inserted, the seat member further including a knob and a first hole, the knob including a handle and a threaded section, the threaded section being screwed to the inner threaded hole, the buckling member being disposed through the first hole; the saddle member being mounted on the handle member and the seat member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 7:
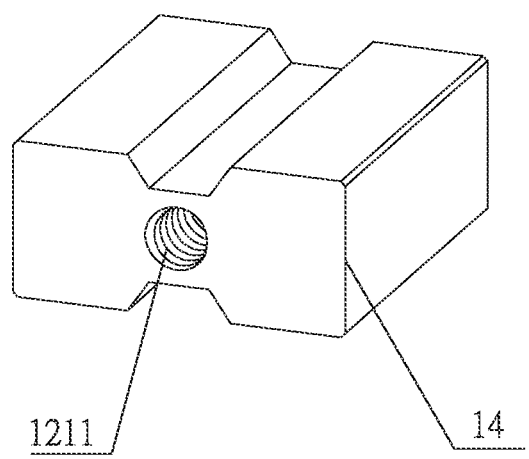
FIG. 7 is a drawing of a nut which is barbell-shaped according to a preferable embodiment of the present invention.

Please refer to FIGS. 1 to 6 for a preferable embodiment of the present invention. A detachable seat assembly of the present invention includes a handle member 1, a seat member 2 and a saddle member 3. The handle member 1 includes a main body 12 and two handle bars 11 connected to two ends of the main body 12, the main body 12 includes a recess 123 and at least one hole 122 at its top side, and the main body 12 further includes a mounting portion 121 at a bottom side thereof. The mounting portion 121 includes an inner threaded hole 1211 at a front side thereof, and a buckling member 1212. Preferably, a nut 14 which is barbell-shaped (FIG. 7) and includes the inner threaded hole 1211 is disposed on the mounting portion 121, wherein the nut which is barbell-shaped can be stably engaged within and positioned to the mounting portion 121. It is noted that the mounting portion 121 may be integrally formed with the inner threaded hole 1211. The buckling member 1212 includes a cap member 12121, an elastic member 12122 and a fixation block 12123 which is abutted against the cap member 12121 and the elastic member 12122, and the fixation block 12123 is fixedly connected to the mounting portion 121 by a screw 12124. The mounting portion 121 further includes a room 1213 at a bottom side thereof, the buckling member 1212 is received within the room 1213, and the elastic member 12122 is compressed within the room 1213 and biases the cap member 12121. The mounting portion 121 further includes a second hole 1214 at the front side thereof, the second hole 1214 may be circular, polygonal or of other shape, the cap member 12121 includes a cap body 121211 and a flange 121212, and the cap body 121211 is disposed through the second hole 1214. The flange 121212 has a diametric dimension larger than a diametric dimension of the second hole 1214 so that the elastic member 12122 can urges the cap body 121211 to project through and out of the second hole 1214 and the flange 121212 is abutted against the inner side of the room 1213.

Figure 1:
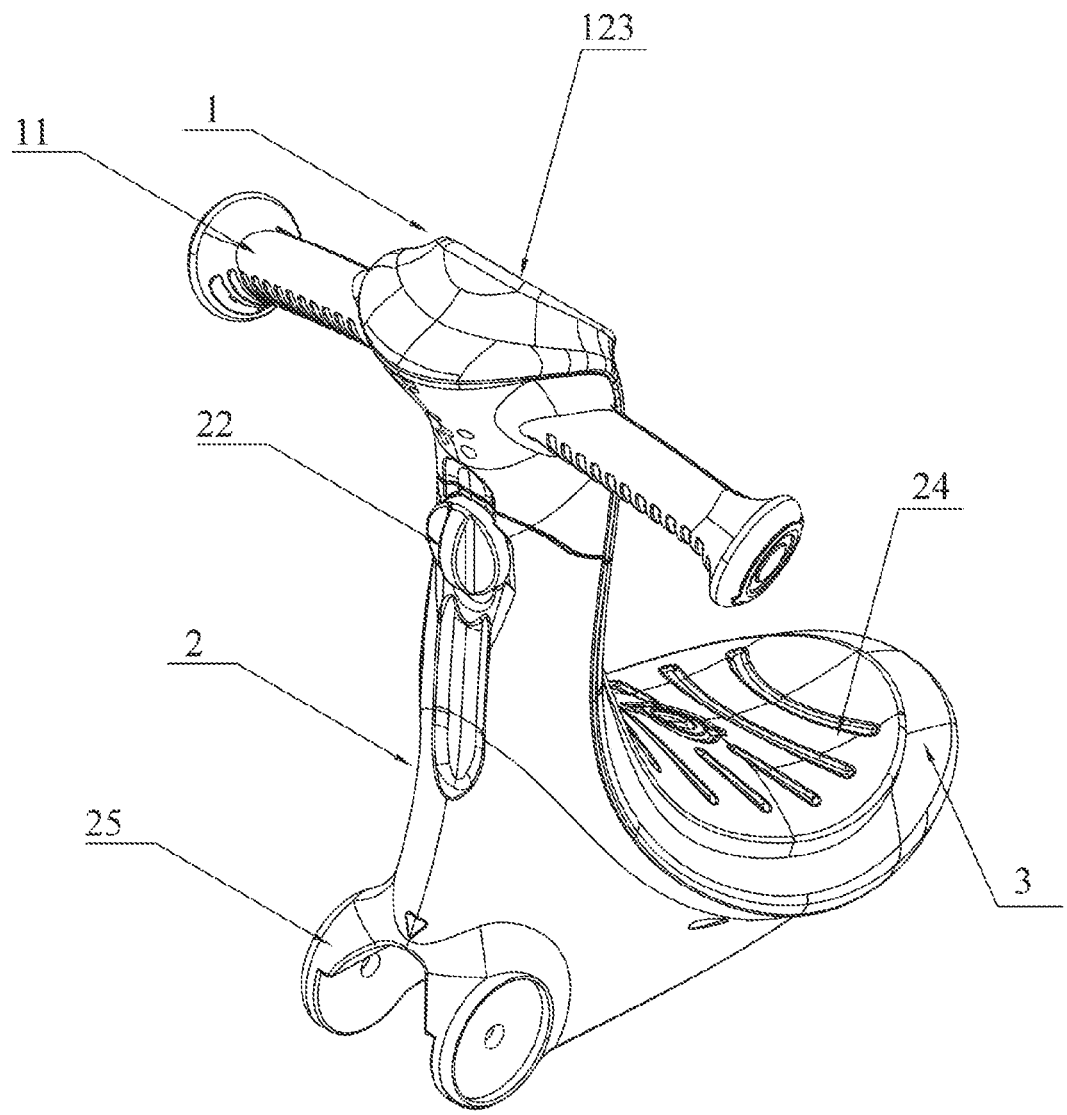
FIG. 1 is a stereogram of a preferable embodiment of the present invention.
Figure 2:
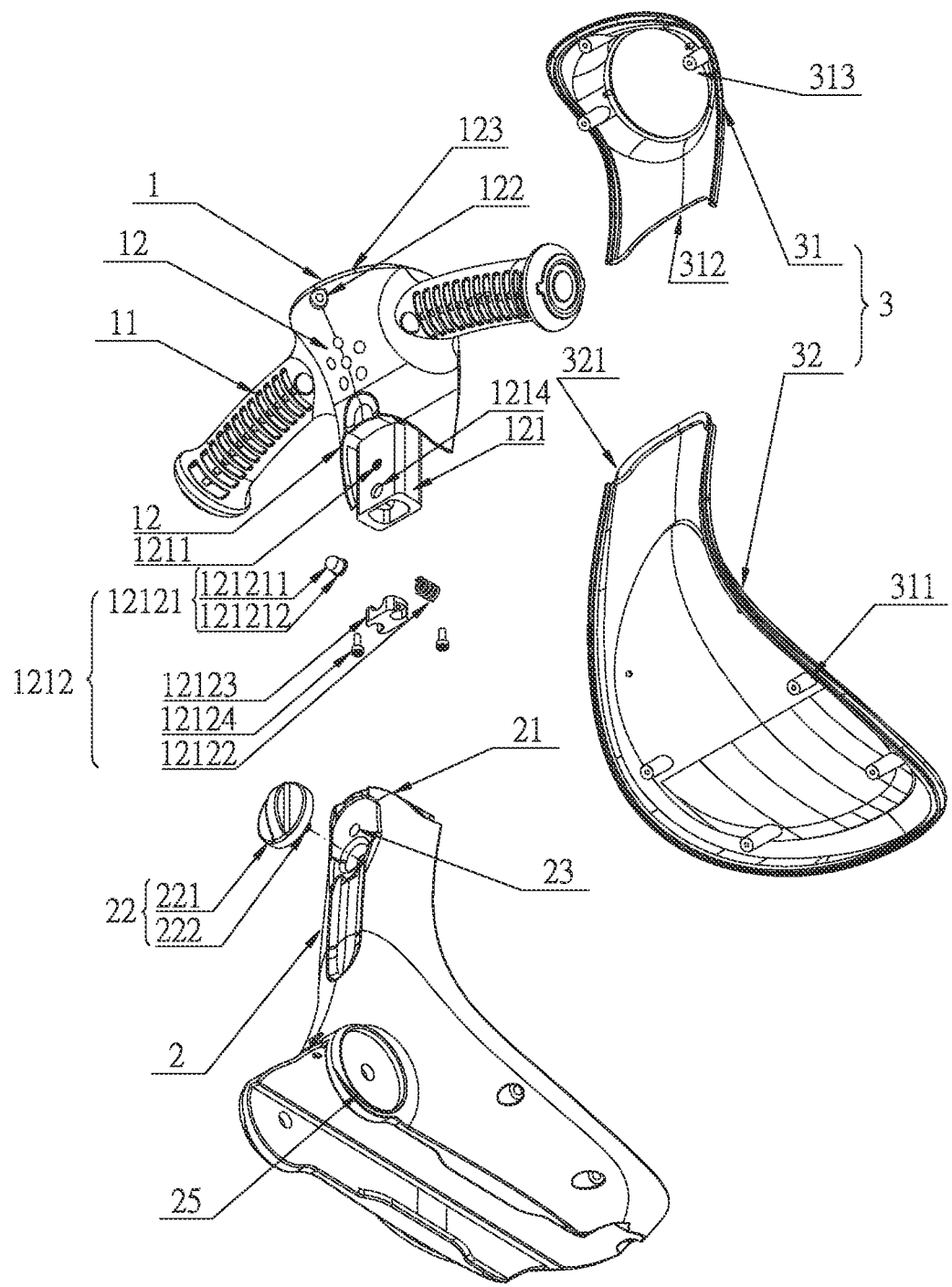
FIG. 2 is a breakdown drawing of a preferable embodiment of the present invention.
Figure 3:
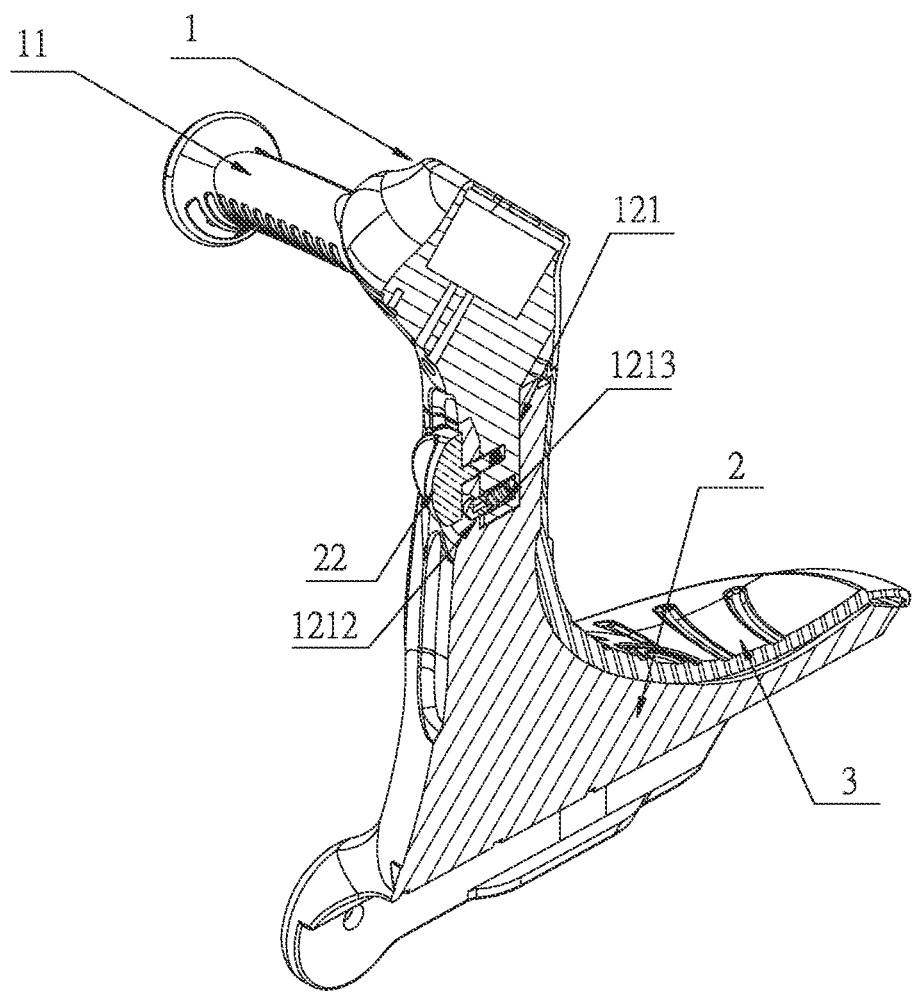
FIG. 3 is a cross-sectional view of a preferable embodiment of the present invention.
Figure 4:
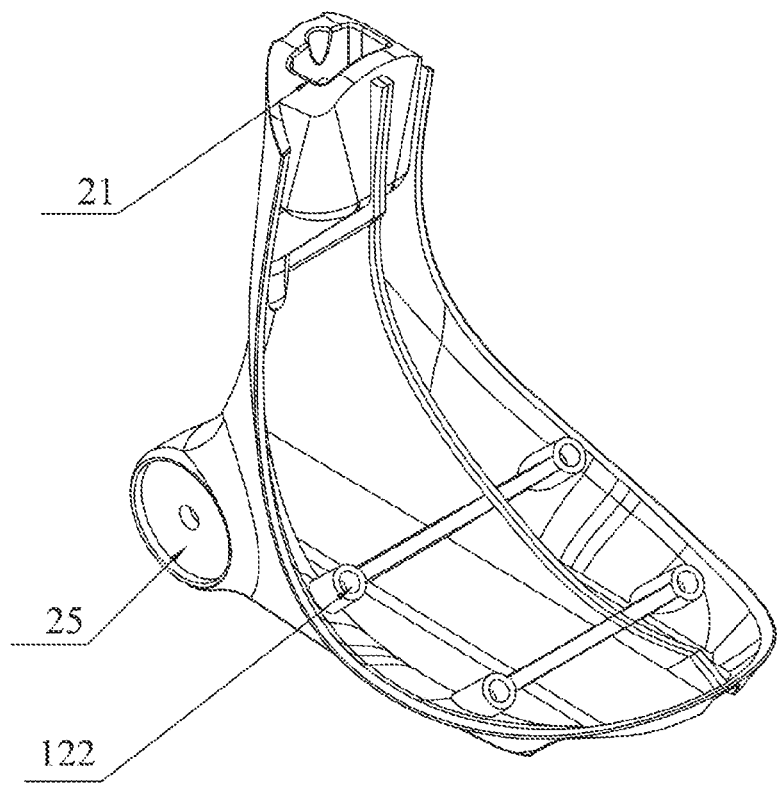
FIG. 4 is a stereogram of a seat member according to a preferable embodiment of the present invention.
Figure 5:
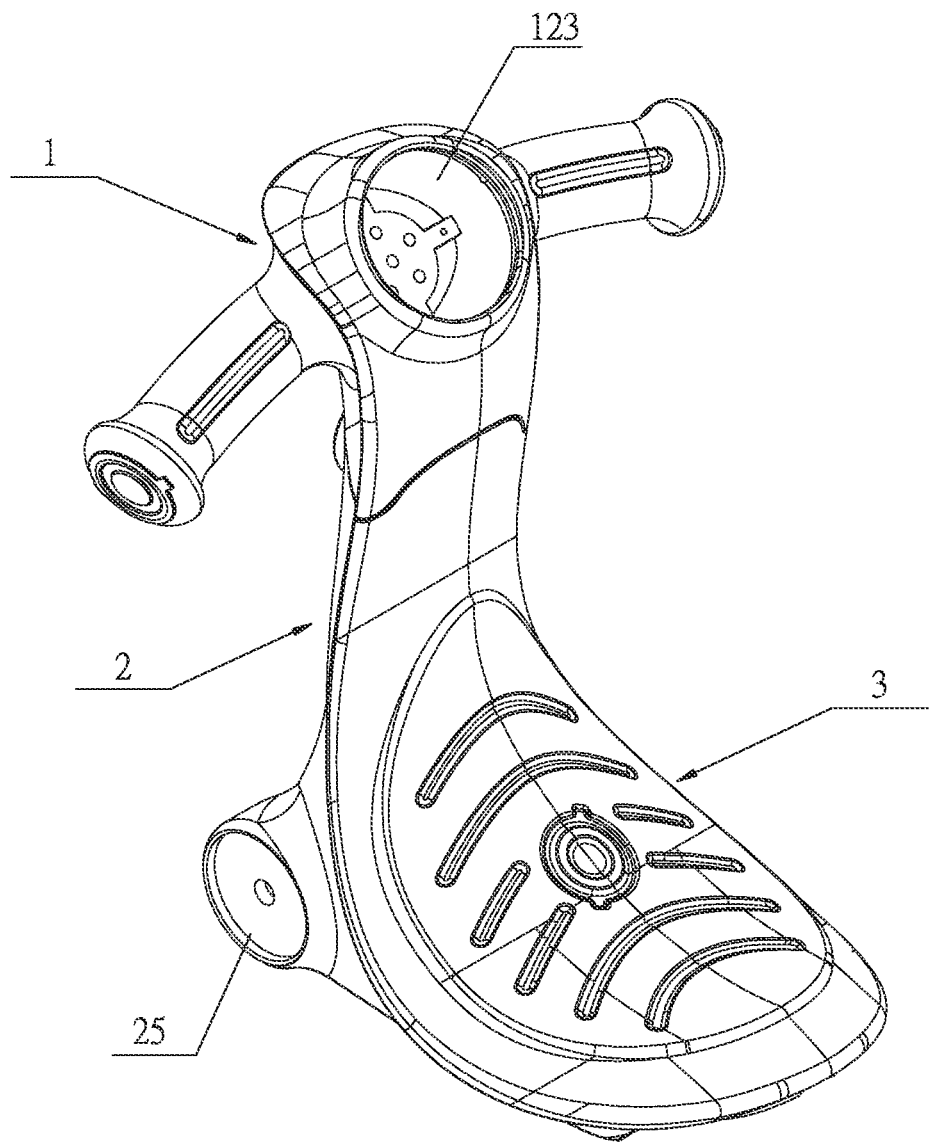
FIG. 5 is another stereogram of a preferable embodiment of the present invention.
Figure 6:
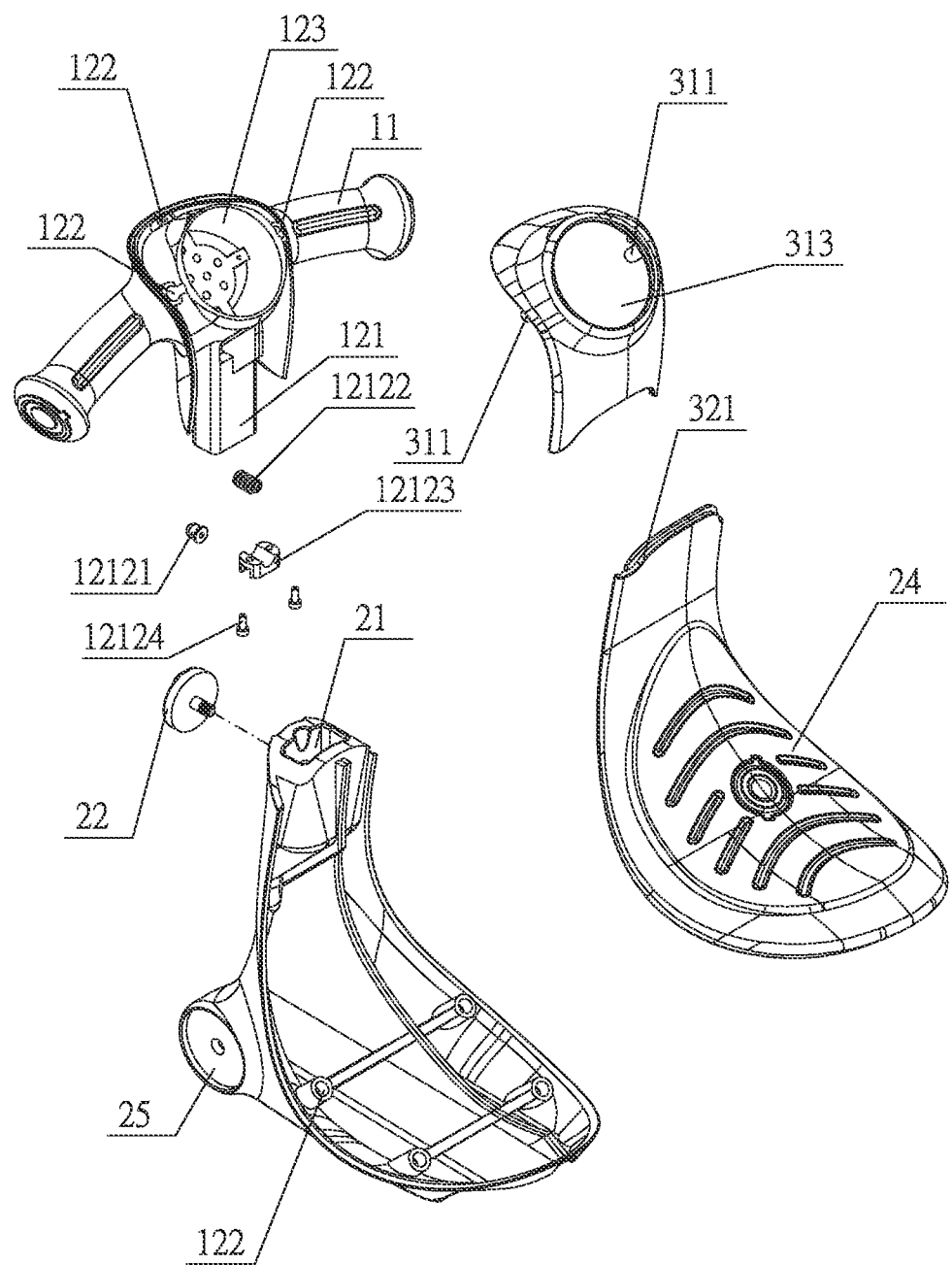
FIG. 6 is another breakdown drawing of a preferable embodiment of the present invention.

The seat member 2 and the handle member 1 are detachably connected. The seat member 2 includes a mounting hole 21 within which the mounting portion 121 is inserted. The seat member 2 further includes at least one hole 122 (as shown in FIG. 4), the seat member 2 further includes a knob 22 and a first hole 23 at its front side, and the first hole 23 may be circular, polygonal or of other shape. The knob 22 includes a handle 221 and a threaded section 222, the threaded section 222 is screwed to the inner threaded hole 1211, and the buckling member 1212 is disposed through the first hole 23.

The saddle member 3 is mounted on the handle member 1 and the seat member 2, and the saddle member 3 includes at least one insertion portion 311 inserted in the at least one hole 122 of the main body 12 and the seat member 2. The saddle member 3 further includes a handle portion 31 and a seat portion 32, the handle portion 31 includes a distal projection 312, and the seat portion 32 includes a groove 321 within which the distal projection 312 is engaged. The handle portion 31 further includes an opening 313 corresponding to the recess 123 of the main body 12. The seat member 2 further includes a protection pad 24 disposed thereon, for comfortable sitting. The seat member 2 further includes an assembling mount 25, for easy and quick mounting to a bike, scooter or the like.

As shown in FIGS. 1 to 6, disassembling of the detachable seat assembly is carried out by: forcing the saddle member 3 so that the at least one insertion portion 311 is detached from the at least one hole 122; forcing the joint of the handle portion 31 and the seat portion 32 of the saddle member 3 so that the handle portion 31 and the seat portion 32 are separated; rotating the knob 22 to remove the threaded section 222 of the knob 22 from the inner threaded hole 1211 and taking away the knob 22; pressing the cap member 12121 of the buckling member 1212 to sink the cap member 12121 into the room 1213; and withdrawing the mounting portion 121 of the handle member 1 from the mounting hole 21 of the seat member 2 so that the handle member 1 and the seat member 2 are disassembled from each other.

Through cooperation of the inner threaded hole, the buckling member and the knob, the handle member and the seat member are detachably connected, whereby providing a detachable structure and quick installation of the detachable seat assembly, being convenient to carry and store, and being capable of wide range of use.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A detachable seat assembly, including: a handle member, a seat member and a saddle member, the handle member including a mounting portion at a bottom side thereof, the mounting portion including an inner threaded hole at a front side thereof and a buckling member; the seat member and the handle member being detachably connected, the seat member including a mounting hole within which the mounting portion is inserted, the seat member further including a knob and a first hole, the knob including a handle and a threaded section, the threaded section being screwed to the inner threaded hole, the buckling member being disposed through the first hole; the saddle member being mounted on the handle member and the seat member.

2. The detachable seat assembly of claim 1, wherein the buckling member includes a cap member, an elastic member and a fixation block which is abutted against the cap member and the elastic member, and the fixation block is fixedly connected to the mounting portion by a screw.

3. The detachable seat assembly of claim 2, wherein the mounting portion further includes a room at a bottom side thereof, the buckling member is received within the room, and the elastic member is compressed within the room and biases the cap member.

4. The detachable seat assembly of claim 2, wherein the mounting portion further includes a second hole at the front side thereof, the cap member includes a cap body and a flange, the cap body is disposed through the second hole, and the flange has a diametric dimension larger than a diametric dimension of the second hole.

5. The detachable seat assembly of claim 1, wherein a nut which is barbell-shaped and includes the inner threaded hole is disposed on the mounting portion.

6. The detachable seat assembly of claim 1, wherein the handle member includes a main body and two handle bars connected to two ends of the main body; the main body includes a hole at its top side, the seat member includes at least one hole, and the saddle member includes at least one insertion portion inserted in the at least one hole of the seat member.

7. The detachable seat assembly of claim 6, wherein the saddle member further includes a handle portion and a seat portion, the handle portion includes a distal projection, and the seat portion includes a groove within which the distal projection is engaged.

8. The detachable seat assembly of claim 6, wherein the main body further includes a recess at its top side, and the handle portion further includes an opening corresponding to the recess.

9. The detachable seat assembly of claim 6, wherein the seat member further includes a protection pad disposed thereon.

10. The detachable seat assembly of claim 1, wherein the seat member further includes an assembling mount at its bottom side.

* * * * *